United States Patent
Chen et al.

(10) Patent No.: US 7,107,384 B1
(45) Date of Patent: Sep. 12, 2006

(54) DYNAMIC PCI-BUS PRE-FETCH WITH SEPARATE COUNTERS FOR COMMANDS OF COMMANDS OF DIFFERENT DATA-TRANSFER LENGTHS

(75) Inventors: Baohua Chen, San Jose, CA (US); Kimchung Arthur Wong, Fremont, CA (US); Zhinan Zhou, San Jose, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 316 days.

(21) Appl. No.: 10/708,412

(22) Filed: Mar. 1, 2004

(51) Int. Cl.
*G06F 13/14* (2006.01)
*G06F 13/36* (2006.01)
*G06K 9/34* (2006.01)
*G06F 3/00* (2006.01)

(52) U.S. Cl. .................. 710/309; 710/35; 710/314; 382/305

(58) Field of Classification Search .................. 710/35
See application file for complete search history.

(56) References Cited

U.S. PATENT DOCUMENTS

| | | | |
|---|---|---|---|
| 4,489,378 A | 12/1984 | Dixon et al. ............... 710/33 |
| 4,621,320 A | 11/1986 | Holste et al. ............... 711/213 |
| 5,146,578 A | 9/1992 | Zangenehpour ............. 711/137 |
| 5,305,389 A * | 4/1994 | Palmer ...................... 382/305 |
| 5,659,713 A | 8/1997 | Goodwin et al. ........... 711/157 |
| 5,761,464 A | 6/1998 | Hopkins ..................... 710/310 |
| 5,918,026 A * | 6/1999 | Melo et al. ................. 710/314 |
| 5,941,981 A | 8/1999 | Tran ........................... 712/207 |
| 5,983,306 A | 11/1999 | Corrigan et al. ............ 710/310 |
| 6,134,643 A | 10/2000 | Kedem et al. .............. 711/213 |
| 6,178,483 B1 | 1/2001 | Runaldue et al. ........... 711/137 |
| 6,185,637 B1 * | 2/2001 | Strongin et al. ............. 710/35 |
| 6,286,074 B1 | 9/2001 | Batchelor et al. ........... 710/305 |
| 6,381,679 B1 | 4/2002 | Matsubara et al. ......... 711/137 |
| 6,385,641 B1 | 5/2002 | Jiang et al. ................. 709/203 |
| 6,457,075 B1 * | 9/2002 | Koutsoures .................. 710/35 |
| 6,502,157 B1 | 12/2002 | Batchelor et al. .......... 710/310 |
| 6,557,080 B1 | 4/2003 | Burger et al. ............... 711/137 |
| 6,578,102 B1 | 6/2003 | Batchelor et al. .......... 710/310 |
| 6,973,528 B1 * | 12/2005 | Bronson et al. ............ 710/310 |
| 2005/0160206 A1 * | 7/2005 | Tsai ........................... 710/52 |

* cited by examiner

*Primary Examiner*—Rehana Perveen
*Assistant Examiner*—Brian Misiura
(74) *Attorney, Agent, or Firm*—Stuart T. Auvinen (57) ABSTRACT

A Peripheral Component Interconnect (PCI) bridge between two buses prefetches read data into a cache. The number of cache lines to prefetch is predicted by a prefetch counter. One prefetch counter is kept for each type of memory-read command: basic memory-read (MR), memory-read-line (MRL) that reads a cache line, and memory-read-multiple (MRM) that reads multiple cache lines. For each type of read command, counters are kept of the number of completed commands, bus-disconnects (indicating under-fetch), and master-discard of data (indicating over-fetch). After a pre-determined number of execution of each type of command, the command's prefetch counter is incremented if under-fetching occurred, or decremented if over-fetching occurred, as indicated by the disconnect and discard counters for that type of read command. The command's other counters are reset. Prefetching is optimized for each type of read command. MRM can prefetch more data than MRL or MR.

17 Claims, 5 Drawing Sheets

DYNAMIC PCI-BUS PRE-FETCH WITH SEPARATE COUNTERS FOR COMMANDS OF COMMANDS OF DIFFERENT DATA-TRANSFER LENGTHS

BACKGROUND OF INVENTION

This invention relates to burst read accesses, and more particularly to predicting burst-lengths of bus transactions.

Traditional main memories often employ caches to speed up access times. A subset of the data in the main memory is stored in a cache memory. When the requested data is in the cache, access is more rapid. Each entry in the cache typically contains a portion of its address, such as a tag.

Various prediction mechanisms exist for pre-fetching data into the cache. For example, when the data is program code, the next several data items can be pre-fetched into the cache, since memory accesses may occur in a linear sequence of addresses. For more random data accesses, pre-fetching may be less effective.

Such prediction methods used for cache memories are less useful for input-output (IO) bus transactions. IO buses often connect to a variety of peripheral devices. Some devices may transfer a small amount of data while other devices transfer large blocks of data at once. Traditional cache-memory prediction methods fail under these non-homogenous conditions.

One popular IO bus is the Peripheral Component Interconnect (PCI), used in many personal computers (PCs), computer servers, storage and network systems. The PCI bus can connect to a wide variety of devices, including memory, disk drives, graphics systems, and controllers to other buses, such as Universal-Serial-Bus (USB) and FireWire (IEEE 1394). A wide variety of input-output devices can be accessed through these other buses, such as memory cards, pointing devices (mice), music devices, printers, etc. The types of bus accesses for this wide variety of devices is quite varied. Predicting ahead in such a varied environment is challenging, yet a good prediction scheme could improve bus performance.

What is desired is a prediction method for an input-output bus that connects to a wide variety of devices. A bus-transaction prediction system is desired for accesses over a PCI bus.

DETAILED DESCRIPTION

The present invention relates to an improvement in bus prefetching. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Rather than predict addresses of future accesses, the inventor predicts the length of a current bus access. Burst accesses can have a wide variety of data lengths, from one byte or one word, to hundreds of bytes up to a limit of 4 K. The burst-length of earlier accesses is used to predict the burst-length for the current access.

Records or statistics from previous transactions are stored and used for predicting the current transaction's burst length. For example, statistics can be kept on the burst-length used for prior transactions, and whether the prior predictions were correct, or if the prior prediction predicted too large of a burst length (over-fetch) or too small (under-fetch).

The past results of prediction are used to adjust the current prediction. For example, when the past prediction was for too large of a burst-length (an over-fetch occurred), then the predicted burst-length for the current access can be reduced. When the past prediction was for too small of a burst-length (an under-fetch occurred), then the predicted burst-length for the current access can be increased.

Rather than keep prediction statistics for each address, statistics are kept for different types of bus transactions. Since accesses to memory-space addresses tend to have larger data-transfer sizes than accesses to IO-space addresses, prefetching and prediction is only performed for memory accesses, not for IO reads. Also, only read accesses use prefetching, since write accesses cannot be for lengths greater than the available write data. Thus burst-length prediction is applied only to memory-read accesses.

PCI bus transactions include a basic memory-read (MR) of one or more bytes, a memory-read-line (MRL) command to read one cache line or more, and a memory-read-multiple (MRM) command to read multiple cache lines. Prediction statistics are kept for each of these 3 read commands. Since the requestor (PCI master) can be on either side of a PCI bridge, statistics are kept for each of the two possible directions, so a total of 6 statistics are kept.

Figure 1:
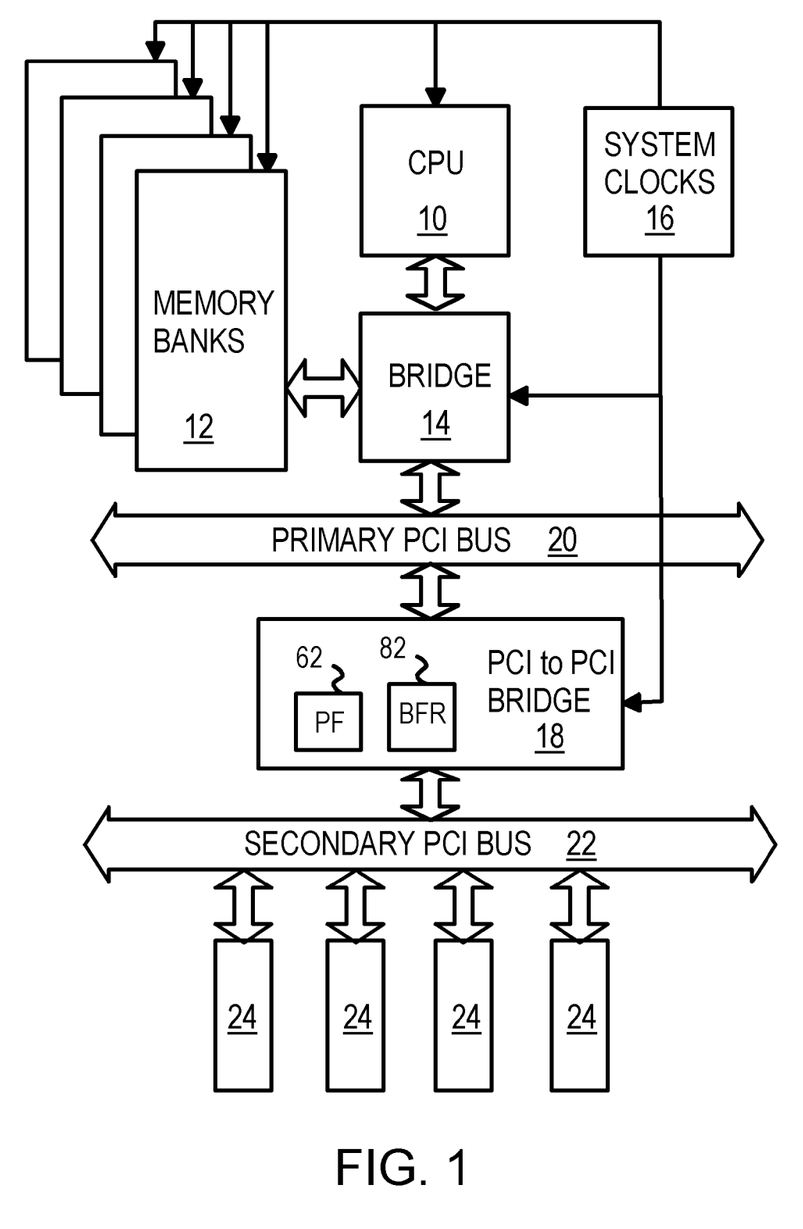
FIG. 1 is a diagram of a system with a PCI bridge.

FIG. 1 is a diagram of a system with a PCI bridge. The system could be an advanced personal computer with two PCI buses. Central processing unit (CPU) 10 executes instructions and reads data from memory banks 12. System clock generator 16 generates clocks to various system components, such as to CPU 10, memory banks 12, CPU bridge 14, and PCI-to-PCI bridge 18.

CPU bridge 14 contains system logic, buffers, state machines, and other controller logic to allow CPU 10 to read memory banks 12. CPU bridge 14 also contains a PCI-bus controller and buffers to bridge requests from CPU 10 to primary PCI bus 20. A PCI master on primary PCI bus 20 may also request access of memory banks 12 through CPU bridge 14.

When many devices are connected to primary PCI bus 20, the bus speeds may be degraded due to capacitive loading on the physical lines of the bus. The physical length of the bus may have to be large, adding resistive and capacitive delays of the physical lines themselves. Thus the size of primary PCI bus 20 may be limited, allowing only a few high-speed devices to be attached to primary PCI bus 20.

Since a PC user may desire to install many peripheral devices or PCI add-on cards to the PC, a second PCI bus is useful. Secondary PCI bus 22 can be larger, or have more available connections, than primary PCI bus 20, allowing for more devices 24 to be installed. PCI devices 24 do not add load to primary PCI bus 20 since PCI-to-PCI bridge 18 buffers the physical lines of secondary PCI bus 22 from the lines of primary PCI bus 20.

PCI-to-PCI bridge 18 contains bus logic, buffers, state machines, and other controller logic to allow CPU 10 or a PCI master on primary PCI bus 20 to access devices 24 on secondary PCI bus 22. PCI-to-PCI bridge 18 contains PCI-bus controllers and buffers in both directions, allowing a PCI master on secondary PCI bus 22 to access a PCI device (acting as a slave) on primary PCI bus 20. A PCI master on secondary PCI bus 22 may also request access of memory banks 12 through PCI-to-PCI bridge 18, primary PCI bus 20, and CPU bridge 14.

PCI-to-PCI bridge 18 contains cache buffer 82, which can store pre-fetched data for the current read command. For example, when CPU 10 reads a memory block on one of devices 24, prefetch controller 62 in PCI-to-PCI bridge 18 may fetch ahead when reading the memory block on device 24. The pre-fetched data is then available for satisfying the current read command if it continues to accept data over an extended burst. The additional data read from device 24 is stored in cache buffer 82. If CPU 10 extends the current cycle with a longer burst access, then the additional data can be sent directly from cache buffer 82 over primary PCI bus 20 to CPU 10 without performing another read transaction of device 24 over secondary PCI bus 22.

Data in cache buffer 82 can be organized into cache lines (lines). The size of the cache line can be fixed or can be determined by a programmable register on PCI-to-PCI bridge 18. For example, the cache line size may be programmed to be 1, 2, 4, 8, 16, or more 32-bit double-words.

While prefetch controller 62 and cache buffer 82 could be placed in CPU bridge 14, CPU bridge 14 may be part of a larger system-logic chip or set of chips made by another manufacturer. In this embodiment, prefetch controller 62 and cache buffer 82 are used with PCI-to-PCI bridge 18.

Figure 2:
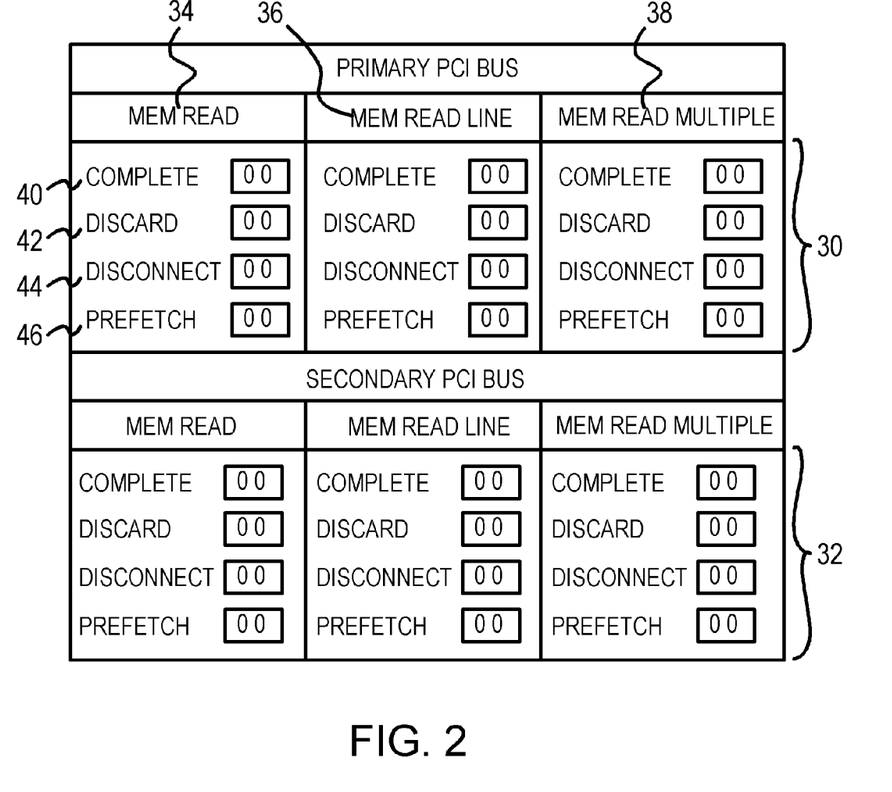
FIG. 2 shows counters that contain statistics used for predicting prefetch burst-lengths.

FIG. 2 shows counters that contain statistics used for predicting prefetch burst-lengths. Either primary PCI bus 20 or secondary PCI bus 22 may contain the PCI bus master (requestor), while the other bus contains the PCI bus slave, or another bridge to the slave. Separate statistics are kept for each direction. Primary counters 30 contain the statistical counters that are used when the PCI master is on (or connected through) primary PCI bus 20, while secondary counters 32 contain the statistical counters that are used when the PCI master is on (or connected through) secondary PCI bus 22.

Each of counters 30, 32 are further divided into sets of counters for each type of read operation. Memory-read counter set 34 contain statistical counters that are used when the PCI master issues a memory-read command that reads one or more bytes of data. Memory-read-line counter set 36 contains statistical counters that are used when the PCI master issues a memory-read-line command to read an entire line of bytes in the cache. Memory-read-multiple counter set 38 contains statistical counters that are used when the PCI master issues a memory-read-multiple command to read more than one line in the cache. Cache lines can vary in size with programmable configurations and hardware chips, but may be 32 double-words (128 bytes) in one embodiment.

Each of counter set 34, 36, 38 contains several counters. For example, memory-read-line counter set 36 contains completed counter 40, discard counter 42, disconnect counter 44, and prefetch-length counter 46.

Length counter 46 indicates the predicted length to prefetch. The length can be a number of cache lines to fetch. When a read-memory command is processed, the double-word is read, then the number of cache lines indicated by length counter 46 is pre-fetched into cache buffer 82. The number of cache lines can be 0 to 3 for a 2-bit binary length counter, or 0–7 for a 3-bit binary length counter.

Completed counter 40 counts the number of read-memory operations that have completed since counter 40 was last reset by the prefetch controller. Only memory-read operations, not memory-read-line or memory-read-multiple operations increment completed counter 40 in counter set 34.

Discard counter 42 is incremented for each memory-read operation that is terminated by the PCI bus master, causing data to be discarded from the buffer in PCI-to-PCI bridge 18. Discarding indicates that over-fetching has occurred, since data is thrown away from cache buffer 82.

Disconnect counter 44 is incremented for each memory-read operation that is terminated by PCI-to-PCI bridge 18 before the PCI master signals the final data transfer. Disconnects occur when the PCI master wants to burst more data but PCI-to-PCI bridge 18 does not have it available in cache buffer 82. Thus disconnects indicate under-fetching.

Similar statistics are kept for other read operations, and for the other direction of transfers. For example, when the PCI master is on secondary PCI bus 22 and performs a read-memory-multiple operation that is disconnected, the disconnect counter in the read-memory-multiple set of counters in counters 32 is incremented.

After the completed counter reaches a pre-defined number, the prefetch-length counter for that type and direction of read-memory operation may be updated. Then the completed counter is cleared. For example, when completed counter 40 for counter set 34 reaches 3, the prefetch controller examines discard counter 42 and disconnect counter 44 in counter set 34 and decides whether to adjust prefetch-length counter 46. When over-fetching has occurred for this type and direction of bus operation, then the number of cache lines to prefetch can be reduced by decrementing prefetch-length counter 46. When under-fetching has occurred for this type and direction of bus operation, then the number of cache lines to prefetch can be increased by incrementing prefetch-length counter 46.

Figure 3A:
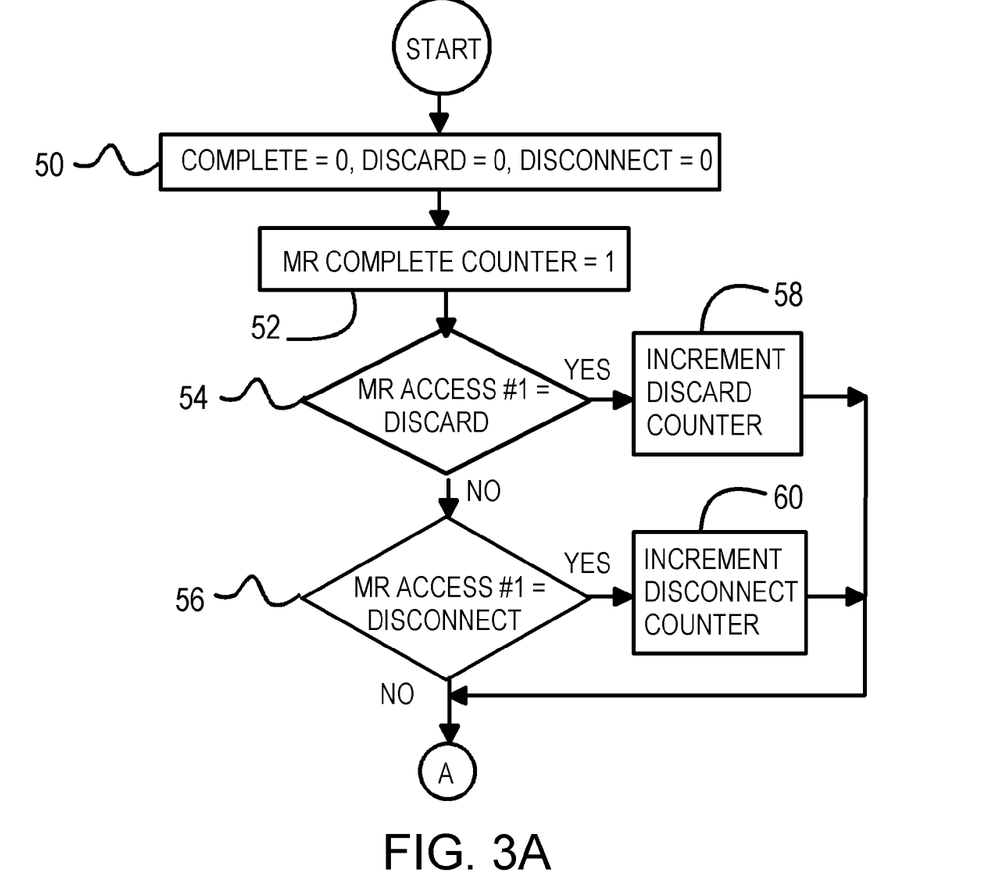
FIGS. 3A–C are flowcharts for dynamic prefetch control using sets of statistic counters.
Figure 3B:
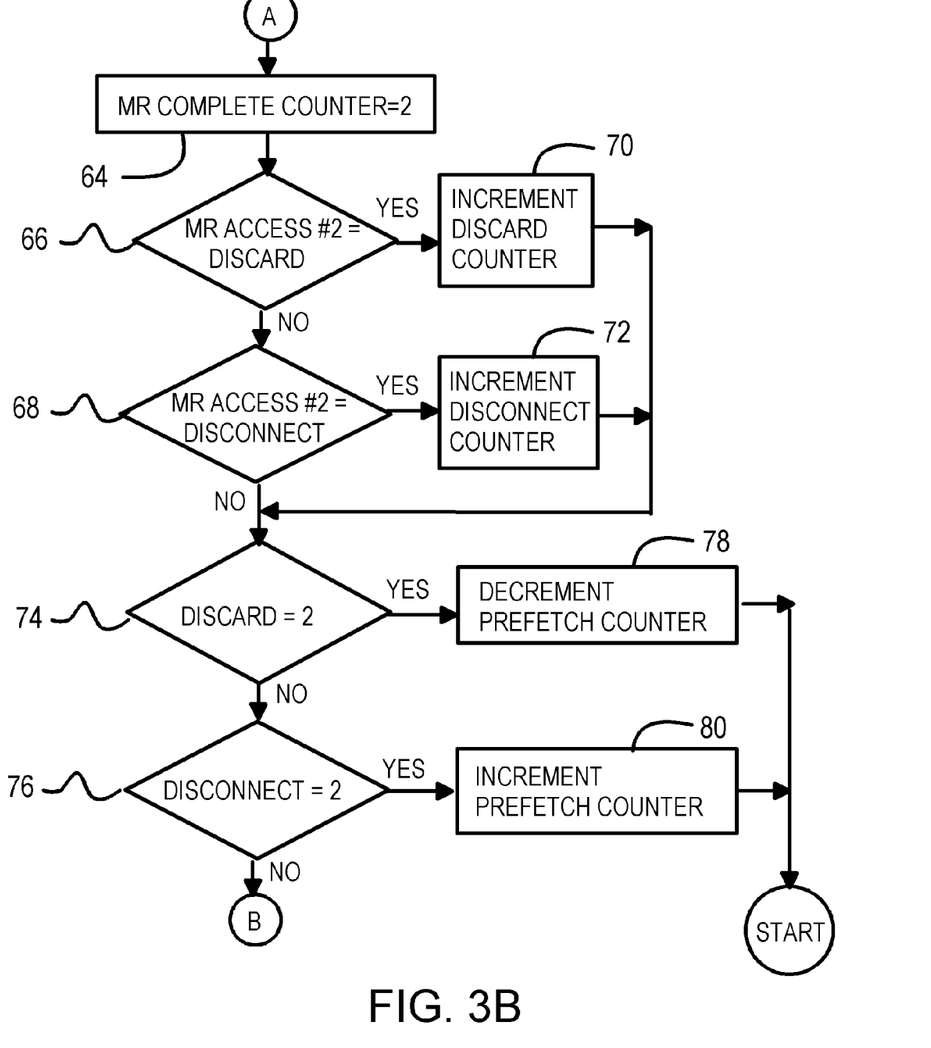
Figure 3C:
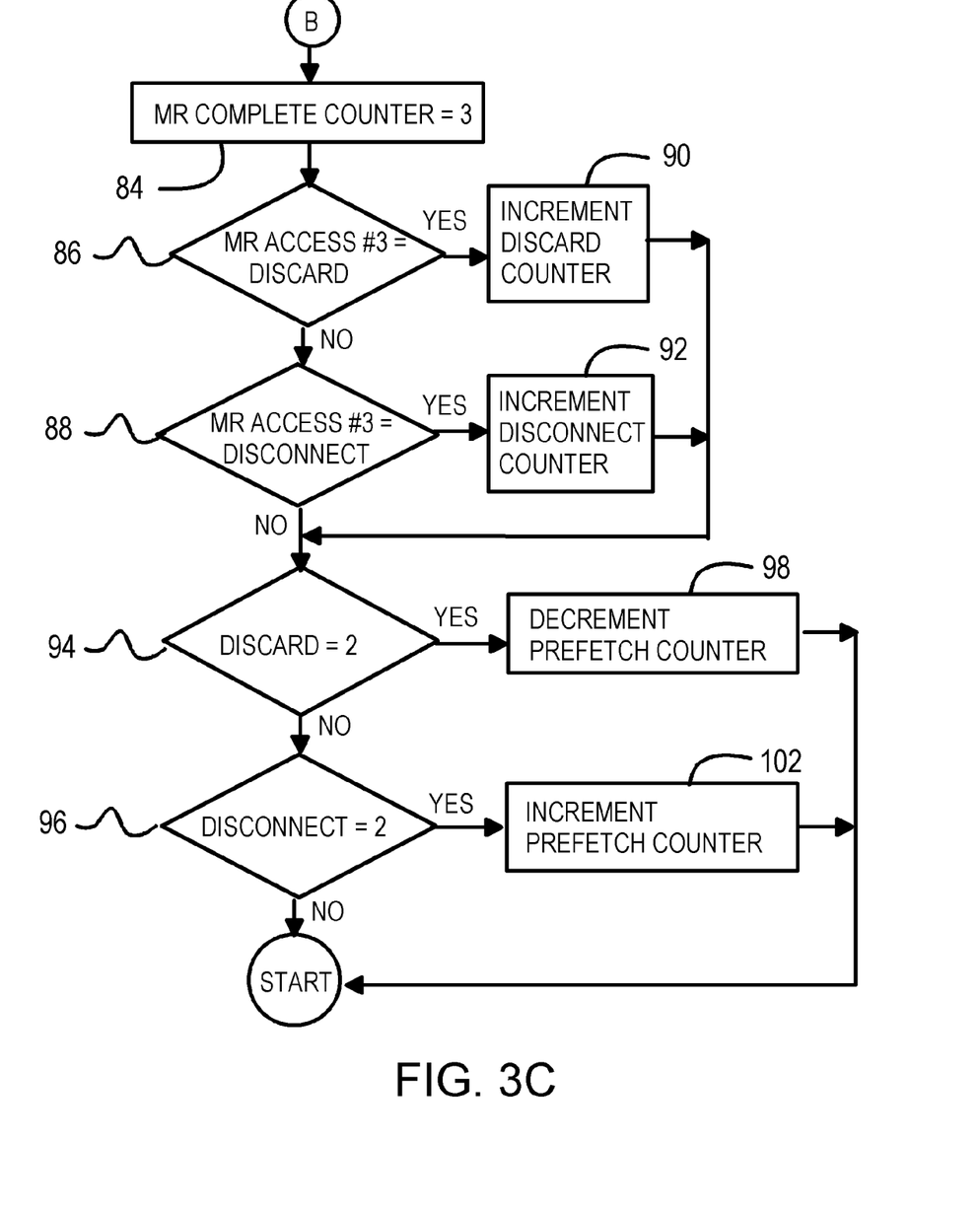

FIGS. 3A–C are flowcharts for dynamic prefetch control using sets of statistic counters. In this example, the flow follows memory-read operations that have the PCI master on primary PCI bus 20, which use memory-read counter set 34. Other types or directions of operations can occur between the operations shown, and similar flows occur simultaneously for other operations (memory-read-line, memory-read-multiple) and the other direction.

The set of counters is initialized by clearing the completed counter, discard counter, and disconnect counter in the set, step 50. After the first operation of the type and direction for the counter set (memory-read MR from primary PCI bus 20), completed counter 40 is incremented from 0 to 1, step 52. If the PCI master terminated the operation and caused data to be discarded in cache buffer 82, step 54, then discard counter 42 is incremented from 0 to 1, step 58. When PCI-to-PCI bridge 18 disconnected and terminated the operation while the PCI master wanted more data, step 56, then disconnect counter 44 is incremented from 0 to 1, step 60.

In FIG. 3B, the second memory-read operation has occurred, so completed counter 40 is again incremented, step 64. When the PCI master terminated the second memory-read operation and caused data to be discarded in cache buffer 82, step 66, then discard counter 42 is incremented, step 70. When PCI-to-PCI bridge 18 disconnected and terminated the second MR operation while the PCI master wanted more data, step 68, then disconnect counter 44 is incremented, step 72.

When discard counter 42 has already reached 2, step 74, over-fetching has occurred in the last two memory-read operations. To compensate, the amount of pre-fetching for future read-memory operations is reduced by decrementing prefetch-length counter 46. The number of cache lines prefetched for future memory-read operations is reduced, step 78. The procedure returns to the start in FIG. 3A, resetting completed counter 40, discard counter 42, and disconnect counter 44.

When disconnect counter 44 has already reached 2, step 76, under-fetching has occurred in the last two memory-read operations. To compensate, the amount of pre-fetching for future read-memory operations is increased by incrementing prefetch-length counter 46. The number of cache lines prefetched for future memory-read operations is increased, step 80. The procedure returns to the start in FIG. 3A, resetting completed counter 40, discard counter 42, and disconnect counter 44.

In FIG. 3C, the third memory-read operation has occurred. Completed counter 40 is again incremented, step 84. When the PCI master terminated the third memory-read operation and caused data to be discarded in cache buffer 82, step 86, then discard counter 42 is incremented, step 90. When PCI-to-PCI bridge 18 disconnected and terminated the third MR operation while the PCI master wanted more data, step 88, then disconnect counter 44 is incremented, step 92.

When discard counter 42 has reached 2, step 94, over-fetching has occurred in the last three memory-read operations. To compensate, the amount of pre-fetching for future read-memory operations is reduced by decrementing prefetch-length counter 46. The number of cache lines prefetched for future memory-read operations is reduced, step 98. The procedure returns to the start in FIG. 3A, resetting completed counter 40, discard counter 42, and disconnect counter 44.

When disconnect counter 44 has reached 2, step 96, under-fetching has occurred in the last three memory-read operations. To compensate, the amount of pre-fetching for future read-memory operations is increased by incrementing prefetch-length counter 46. The number of cache lines prefetched for future memory-read operations is increased, step 102. The procedure returns to the start in FIG. 3A, resetting completed counter 40, discard counter 42, and disconnect counter 44.

ALTERNATE EMBODIMENTS

Several other embodiments are contemplated by the inventors. For example the invention could be applied to other kinds of peripheral buses such as PCI-Express, USB, Firewire, serial AT attachment (SATA), small-computer system interface (SCSI), Ethernet of different speeds, etc. Additional bridges to additional buses could be present with or without the prefetch prediction for transactions across the bridge. More complex bus structures could be used. Multi-port PCI-to-PCI bridges with 3 or more ports can have additional sets of counters for statistics.

Rather than adjusting the prefetch-length counter when 2 out of a last 3 operation of a certain type and direction show under- or over-fetching, different numbers of operations can be used. For example, adjustment could occur after every 5 operations of a certain type, or when more than 60% of the operations result in discarding or disconnection. The counters could be examined only after the pre-determined number of operations occurs, rather than when the pre-determined threshold number of discards or disconnects occurs. The statistics could be examined periodically rather than after a certain number of completed operations. For example, a timer interrupt could cause the prefetch controller to examine each set of statistic counters at pre-determined time intervals.

The prefetch controller could be implemented as hardware logic gates, state machines, software or firmware for a programmable controller or logic array, or some combination. The amount of data for a read command may not be know at first, so accurate prefetch prediction can supply the data from the cache to the bus master directly when prediction is accurate. The cache is invalidated after each read command to prevent stale data. Cache lines can have 64, 128, 256, or more bytes of data. The memory read command may read 1 to 4 bytes or 1 or 8 bytes. The memory-read-line command may read parts of two cache lines rather than just one cache line when the request is not exactly aligned to the cache line.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A Peripheral Component Interconnect (PCI) bridge comprising:
   a first interface to a first PCI bus;
   a second interface to a second PCI bus;
   a cache buffer for storing data read from a PCI-bus memory for a current command;
   prefetch control means for fetching data from the PCI-bus memory into the cache buffer for the current command, the prefetch control means fetching a maximum amount of data determined by a prefetch count;
   wherein the current command is a read command or a read-multiple command, the read-multiple command able to read a larger amount of data than the read command;
   first statistical means, responsive when the current command is the read command to read from the PCI-bus memory on the first PCI bus, for generating the prefetch count for the read command by storing statistics indicating under-fetching and over-fetching of prior read commands; and
second statistical means, responsive when the current command is the read-multiple command to read from the PCI-bus memory on the first PCI bus, for generating the prefetch count for the read-multiple command by storing statistics indicating under-fetching and over-fetching of prior read-multiple commands;
wherein the first statistical means further comprises:
first prefetch count means for generating the prefetch count when the current command is the read command;
first under-prefetching count means for tracking read commands wherein the prefetch control means under-prefetched data into the cache buffer;
first over-prefetching count means for tracking read commands wherein the prefetch control means over-prefetched data into the cache buffer;
first adjust means, coupled to the first prefetch count means, for increasing the prefetch count generated by the first prefetch count means in response to the first under-prefetching count means indicating that insufficient data was prefetched into the cache buffer in the prior read commands, and for decreasing the prefetch count generated by the first prefetch count means in response to the first over-prefetching count means indicating that un-read data was prefetched into the cache buffer in the prior read commands;
wherein the second statistical means further comprises:
second prefetch count means for generating the prefetch count when the current command is the read-multiple command;
second under-prefetching count means for tracking read-multiple commands wherein the prefetch control means under-prefetched data into the cache buffer;
second over-prefetching count means for tracking read-multiple commands wherein the prefetch control means over-prefetched data into the cache buffer; and
second adjust means, coupled to the second prefetch count means, for increasing the prefetch count generated by the second prefetch count means in response to the second under-prefetching count means indicating that insufficient data was prefetched into the cache buffer in the prior read-multiple commands, and for decreasing the prefetch count generated by the second prefetch count means in response to the second over-prefetching count means indicating that un-read data was prefetched into the cache buffer in the prior read-multiple commands;
wherein the first under-prefetching means comprises a first disconnect means for advancing an indication of under-prefetching when the read command is terminated by the PCI-bus memory disconnecting from the first PCI bus before sufficient data is transferred to the cache buffer;
wherein the first over-prefetching means comprises a first discard means for advancing an indication of over-prefetching when the read command terminates before all data prefetched from the PCI-bus memory for the read command is read by a requestor that generated the read command;
wherein the second under-prefetching means comprises a second disconnect means for advancing an indication of under-prefetching when the read-multiple command is terminated by the PCI-bus memory disconnecting from the second PCI bus before sufficient data is transferred to the cache buffer;

wherein the second over-prefetching means comprises a second discard means for advancing an indication of over-prefetching when the read-multiple command terminates before all data prefetched from the PCI-bus memory for the read-multiple command is read by a requester that generated the read-multiple command,
whereby separate prefetching statistics for the read command and for the read-multiple command generate the prefetch count.

2. The PCI bridge of claim 1 wherein the first statistical means further comprises:
first completion means for counting a number of the prior read commands that completed;
first reset means, coupled to the first adjust means, for resetting the first completion means, the first under-prefetching means, and the first over-prefetching means after a predetermined number of the prior read commands have completed;
wherein the second statistical means further comprises:
second completion means for counting a number of the prior read-multiple commands that completed; and
second reset means, coupled to the second adjust means, for resetting the second completion means, the second under-prefetching means, and the second over-prefetching means after a predetermined number of the prior read-multiple commands have completed.

3. A Peripheral Component Interconnect (PCI) bridge comprising:
a first interface to a first PCI bus;
a second interface to a second PCI bus;
a cache buffer for storing data read from a PCI-bus memory for a current command;
prefetch control means for fetching data from the PCI-bus memory into the cache buffer for the current command, the prefetch control means fetching a maximum amount of data determined by a prefetch count;
wherein the current command is a read command or a read-multiple command, the read-multiple command able to read a larger amount of data than the read command;
first statistical means, responsive when the current command is the read command to read from the PCI-bus memory on the first PCI bus, for generating the prefetch count for the read command by storing statistics indicating under-fetching and over-fetching of prior read commands; and
second statistical means, responsive when the current command is the read-multiple command to read from the PCI-bus memory on the first PCI bus, for generating the prefetch count for the read-multiple command by storing statistics indicating under-fetching and over-fetching of prior read-multiple commands;
wherein the current command is a read-line command that is able to read less data than the read-multiple command, and able to read a larger amount of data than the read command;
third statistical means, responsive when the current command is the read-line command to read from the PCI-bus memory on the first PCI bus, for generating the prefetch count for the read-line command by storing statistics indicating under-fetching and over-fetching of prior read-line commands;
wherein the third statistical means further comprises:
third prefetch count means for generating the prefetch count when the current command is the read-line command;

third under-prefetching count means for tracking read-line commands wherein the prefetch control means under-prefetched data into the cache buffer;

third over-prefetching count means for tracking read-line commands wherein the prefetch control means over-prefetched data into the cache buffer;

third adjust means, coupled to the third prefetch count means, for increasing the prefetch count generated by the third prefetch count means in response to the third under-prefetching count means indicating that insufficient data was prefetched into the cache buffer in the prior read-line commands, and for decreasing the prefetch count generated by the third prefetch count means in response to the third over-prefetching count means indicating that un-read data was prefetched into the cache buffer in the prior read-line commands;

third completion means for counting a number of the prior read-line commands that completed; and third reset means, coupled to the third adjust means, for resetting the third completion means, the third under-prefetching means, and the third over-prefetching means after a predetermined number of the prior read-line commands have completed, whereby separate prefetching statistics for the read command and for the read-multiple command generate the prefetch count.

4. The PCI bridge of claim 3 wherein the read-line command reads an amount of data ranging from a portion of one line in the cache buffer, up to two lines in the cache buffer.

5. A Peripheral Component Interconnect (PCI) bridge comprising:

a first interface to a first PCI bus;

a second interface to a second PCI bus;

a cache buffer for storing data read from a PCI-bus memory for a current command;

prefetch control means for fetching data from the PCI-bus memory into the cache buffer for the current command, the prefetch control means fetching a maximum amount of data determined by a prefetch count;

wherein the current command is a read command or a read-multiple command, the read-multiple command able to read a larger amount of data than the read command;

first statistical means, responsive when the current command is the read command to read from the PCI-bus memory on the first PCI bus, for generating the prefetch count for the read command by storing statistics indicating under-fetching and over-fetching of prior read commands;

second statistical means, responsive when the current command is the read-multiple command to read from the PCI-bus memory on the first PCI bus, for generating the prefetch count for the read-multiple command by storing statistics indicating under-fetching and over-fetching of prior read-multiple commands;

wherein the current command is the read command, a read-line command, or the read-multiple command to read from the second PCI bus or from the first PCI bus;

first reverse statistical means, responsive when the current command is the read command to read from the PCI-bus memory on the second PCI bus, for generating the prefetch count for the read command by storing statistics indicating under-fetching and over-fetching of prior read commands;

second reverse statistical means, responsive when the current command is the read-multiple command to read from the PCI-bus memory on the second PCI bus, for generating the prefetch count for the read-multiple command by storing statistics indicating under-fetching and over-fetching of prior read-multiple commands; and third reverse statistical means, responsive when the current command is the read-line command to read from the PCI-bus memory on the second PCI bus, for generating the prefetch count for the read-line command by storing statistics indicating under-fetching and over-fetching of prior read-line commands, whereby separate prefetching statistics for the read command and for the read-multiple command generate the prefetch count and whereby separate prefetching statistics are used when the PCI-bus memory is on the second PCI bus and when on the first PCI bus.

6. The PCI bridge of claim 5 wherein the second reverse statistical means further comprises:

second reverse prefetch count means for generating the prefetch count when the current command is the read-multiple command;

second reverse under-prefetching count means for tracking read-multiple commands wherein the prefetch control means under-prefetched data into the cache buffer;

second reverse over-prefetching count means for tracking read-multiple commands wherein the prefetch control means over-prefetched data into the cache buffer;

second reverse adjust means, coupled to the second reverse prefetch count means, for increasing the prefetch count generated by the second reverse prefetch count means in response to the second reverse under-prefetching count means indicating that insufficient data was prefetched into the cache buffer in the prior read-multiple commands, and for decreasing the prefetch count generated by the second reverse prefetch count means in response to the second reverse over-prefetching count means indicating that un-read data was prefetched into the cache buffer in the prior read-multiple commands;

second reverse completion means for counting a number of the prior read-multiple commands that completed;

second reverse reset means, coupled to the second reverse adjust means, for resetting the second reverse completion means, the second reverse under-prefetching means, and the second reverse over-prefetching means after a predetermined number of the prior read-multiple commands have completed.

7. The PCI bridge of claim 6 wherein the third reverse statistical means further comprises:

third reverse prefetch count means for generating the prefetch count when the current command is the read-line command;

third reverse under-prefetching count means for tracking read-line commands wherein the prefetch control means under-prefetched data into the cache buffer;

third reverse over-prefetching count means for tracking read-line commands wherein the prefetch control means over-prefetched data into the cache buffer;

third reverse adjust means, coupled to the third reverse prefetch count means, for increasing the prefetch count generated by the third reverse prefetch count means in response to the third reverse under-prefetching count means indicating that insufficient data was prefetched into the cache buffer in the prior read-line commands, and for decreasing the prefetch count generated by the third reverse prefetch count means in response to the third reverse over-prefetching count means indicating that un-read data was prefetched into the cache buffer in the prior read-line commands;

third reverse completion means for counting a number of the prior read-line commands that completed;

third reverse reset means, coupled to the third reverse adjust means, for resetting the third reverse completion means, the third reverse under-prefetching means, and the third reverse over-prefetching means after a predetermined number of the prior read-line commands have completed.

8. A prefetching predictor for predicting prefetching of data from a bus to a cache comprising:

a first set of counters for predicting a first length of data to prefetch for a first read command;

a second set of counters for predicting a second length of data to prefetch for a second read command;

a third set of counters for predicting a third length of data to prefetch for a third read command;

each of the first, second, and third set of counters comprising:

a prefetch-length counter that indicates a data length to prefetch;

a disconnect counter that is advanced for each matching command that is disconnected by a bus slave; and a discard counter that is advanced for each matching command that discards prefetched data in the cache;

wherein a matching command is the first read command for the first set of counters, the second read command for the second set of counters, or the third read command for the third set of counters;

wherein the first read command, the second read command, and the third read command are commands for reading differing amounts of data from the bus slave, whereby sets of counters are kept for read commands for differing amounts of data.

9. The prefetching predictor of claim 8 wherein the matching command is sent by a bus master requesting to read from the bus slave, the discard counter in a matching set of counters being advanced when the bus master terminates reading and prefetched data in the cache is discarded.

10. The prefetching predictor of claim 8 further comprising:

a data fetcher for reading data from the bus slave on the bus in response to the first, second, or third read command, the data fetcher attempting to read an amount of data from the bus slave indicated by the prefetch-length counter in the first set of counters in response to the first read command, or the prefetch-length counter in the second set of counters in response to the second read command, or the prefetch-length counter in the third set of counters in response to the third read command.

11. The prefetching predictor of claim 10:

wherein the first read command has a first data length of one to eight bytes;

wherein the second read command has a second data length of one cache line;

wherein the third read command has a third data length of more than one cache line;

wherein the one cache line is at least 128 bytes.

12. The prefetching predictor of claim 10 wherein the first read command is a read-memory (MR) command;

wherein the second read command is a read-memory-line (MRL) command;

wherein the third read command is a read-memory-multiple (MRM) command.

13. The prefetching predictor of claim 10 wherein each of the first, second, and third set of counters further comprises:

a completion counter that is advanced for each completed command of a matching command type.

14. The prefetching predictor of claim 13 further comprising:

a prefetch adjustor, activated to adjust the prefetch-length counter in a selected set of counters when the completion counter in the selected set of counters reaches a pre-determined number, the prefetch adjustor decrementing the prefetch-length counter when the discard counter reaches a discard-count value, the prefetch adjustor incrementing the prefetch-length counter when the disconnect counter reaches a disconnect-count value;

wherein the selected set is the first, second, or third set of counters.

15. The prefetching predictor of claim 14 further comprising:

counter reset logic, activated by the prefetch adjustor, the counter reset logic clearing the discard counter, the disconnect counter, and the completion counter in the selected set of counters after the completion counter in the selected set of counters reaches the pre-determined number.

16. A prefetch-length prediction method comprising:

receiving a read command from a bus master, the read command being a read command, or a read-multiple command, the read-multiple command being able to read more data from a bus slave than the read command;

incrementing a read-completion counter upon completion of the read command;

incrementing a read-discard counter when the read command is terminated by the bus master and prefetched data for the read command in a cache is discarded;

incrementing a read-disconnect counter when the read command is terminated by the bus slave before the bus master finishes reading data and no prefetched data for the read command in the cache is discarded;

incrementing a read-multiple-completion counter upon completion of the read-multiple command;

incrementing a read-multiple-discard counter when the read-multiple command is terminated by the bus master and prefetched data for the read-multiple command in a cache is discarded;

incrementing a read-multiple-disconnect counter when the read-multiple command is terminated by the bus slave before the bus master finishes reading data and no prefetched data for the read-multiple command in the cache is discarded;

when the read-completion counter reaches a predetermined count, incrementing a read-prefetch counter when the read-disconnect counter exceeds a disconnect threshold, decrementing the read-prefetch counter when the read-discard counter exceeds a discard threshold, and clearing the read-completion counter, the read-discard counter, and the read-disconnect counter;

when the read-multiple-completion counter reaches a predetermined count, incrementing a read-multiple-prefetch counter when the read-multiple-disconnect counter exceeds the disconnect threshold, decrementing the read-multiple-prefetch counter when the read-multiple-discard counter exceeds the discard threshold, and clearing the read-multiple-completion counter, the read-multiple-discard counter, and the read-multiple-disconnect counter;

prefetching up to a number of cache lines indicated by the read-prefetch counter when the read command is executed; and prefetching up to a number of cache lines indicated by the read-multiple-prefetch counter when the read-multiple command is executed, whereby prefetch length is separately predicted for the read command and the read-multiple command.

17. The prefetch-length prediction method of claim 16 wherein the read command is a read-line command, the read command, or the read-multiple command, the read-line command being able to read more data from a bus slave than the read command, the read-multiple command being able to read more data from a bus slave than the read-line command or the read command;

further comprising:

incrementing a read-line-completion counter upon completion of the read-line command;

incrementing a read-line-discard counter when the read-line command is terminated by the bus master and prefetched data for the read-line command in a cache is discarded;

incrementing a read-line-disconnect counter when the read-line command is terminated by the bus slave before the bus master finishes reading data and no prefetched data for the read-line command in the cache is discarded;

when the read-line-completion counter reaches a predetermined count, incrementing a read-line-prefetch counter when the read-line-disconnect counter exceeds the disconnect threshold, decrementing the read-line-prefetch counter when the read-line-discard counter exceeds the discard threshold, and clearing the read-line-completion counter, the read-line-discard counter, and the read-line-disconnect counter; and prefetching up to a number of cache lines indicated by the read-line-prefetch counter when the read-line command is executed.

* * * * *